United States Patent [19]

Schwartz et al.

[11] 4,235,490

[45] Nov. 25, 1980

[54] VIDEO CASSETTE STORAGE AND EJECTION DEVICE

[75] Inventors: Gary M. Schwartz, East Windsor; Louis Simon, Branchburg, both of N.J.

[73] Assignee: Le-Bo Products Company, Inc., Maspeth, N.Y.

[21] Appl. No.: 973,154

[22] Filed: Dec. 26, 1978

[51] Int. Cl.² .................................................. A47B 81/06
[52] U.S. Cl. ....................................... 312/15; 312/18; 206/387; 211/41
[58] Field of Search .................... 312/9, 10, 11, 12, 13, 312/14, 15, 16, 17, 18, 19, 319; 211/40, 41, 49 R; 206/387

[56] References Cited

U.S. PATENT DOCUMENTS

| 570,338 | 10/1896 | Reed | 211/41 |
|---|---|---|---|
| 1,432,559 | 10/1922 | Jamieson | 312/12 |
| 2,330,173 | 9/1943 | Gordon, Jr. et al. | 312/15 |
| 2,660,506 | 11/1953 | Wright | 312/319 |
| 3,477,774 | 11/1969 | Atwood | 211/49 R |
| 3,603,478 | 9/1971 | Connan | 206/387 |
| 3,677,396 | 7/1972 | Staar | 206/387 |
| 3,836,222 | 9/1974 | Kuntze | 312/10 |
| 3,854,785 | 12/1974 | Manner et al. | 312/319 |
| 3,926,310 | 12/1975 | Ackeret | 206/387 |
| 4,024,954 | 5/1977 | Staar | 206/387 |

FOREIGN PATENT DOCUMENTS

| 1580720 | 9/1969 | France | 206/387 |
|---|---|---|---|
| 1503568 | 3/1978 | United Kingdom | 312/9 |

*Primary Examiner*—Victor N. Sakran

*Attorney, Agent, or Firm*—Philip H. Gottfried

[57] ABSTRACT

A container for storing and selectively presenting video tape cassettes of substantially equal thickness and depth and either a first or a second height includes a longitudinally extending box having longitudinally extending rear, bottom and top walls and transversely extending end walls defining a storage area having depth in excess of the depth of the cassettes. Partitions are provided which define storage locations, each of which has a longitudinal extent slightly in excess of the thickness of the cassettes, with the thickness and spacing of the partitions being such that when cassettes are placed into two adjacent storage locations, the space between them is insufficient to accommodate a human finger. Transversely extending ejection members, each mounted to the rear wall and projecting into one of the storage locations, each have a contact surface which is movable from a first position to a second position and is adapted to contact the rear panel of one of the cassettes when the cassette is inserted into the storage location with the rear panel at the first position. The ejection members are placed under sufficient compression when the contact surfaces are moved, by a cassette forcing them from the first to the second position, that when the cassette is subsequently released, the ejection member urges it a sufficient transverse distance such that at least a portion of the front of the cassette may be grasped by human fingers. A spacing member is removably mounted within at least one of the storage locations for use in adjusting the height of the storage location to accept cassettes of either the first or the second height.

10 Claims, 8 Drawing Figures

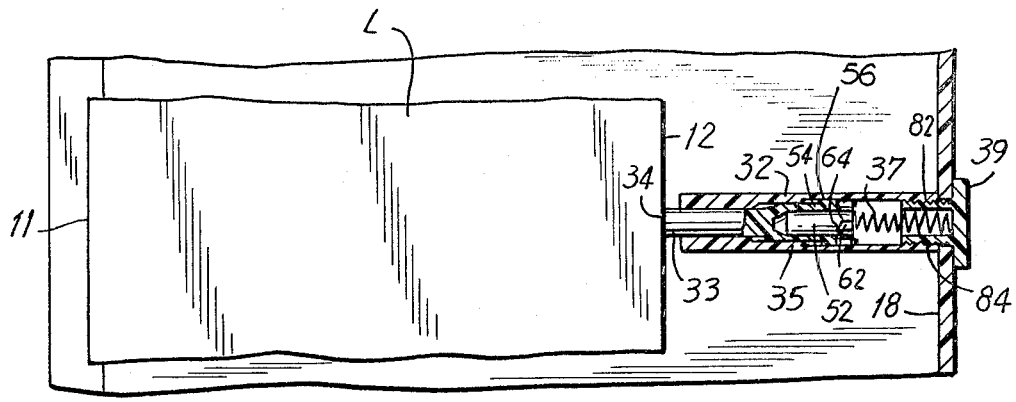
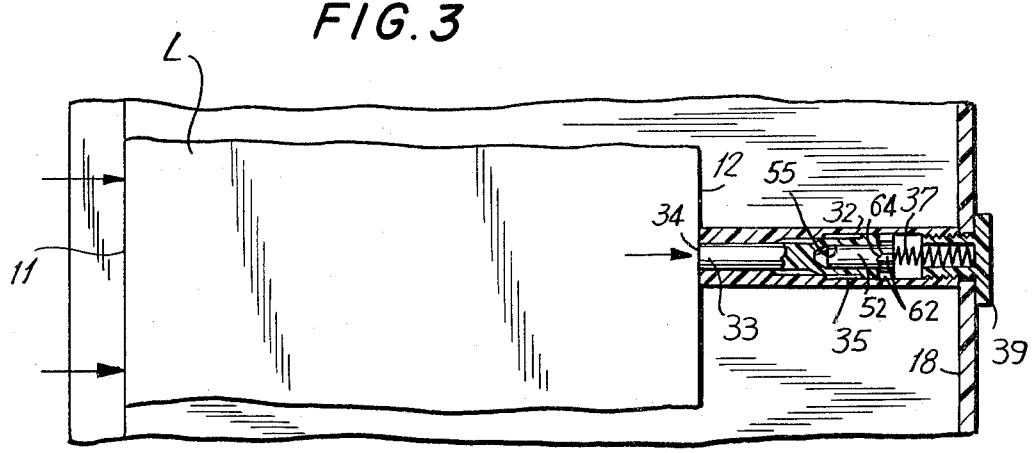
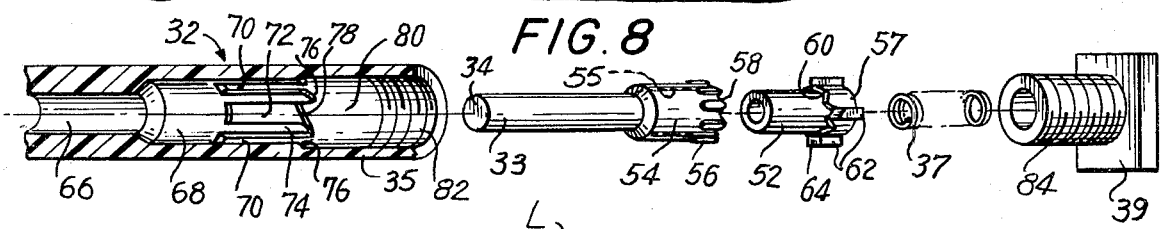
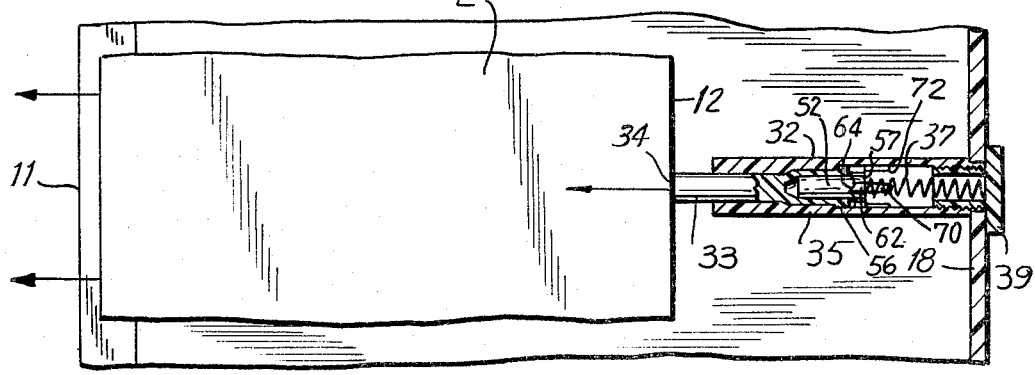

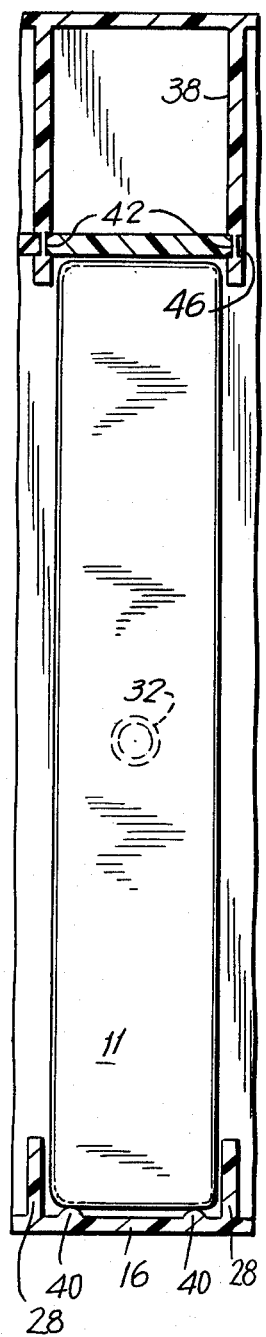
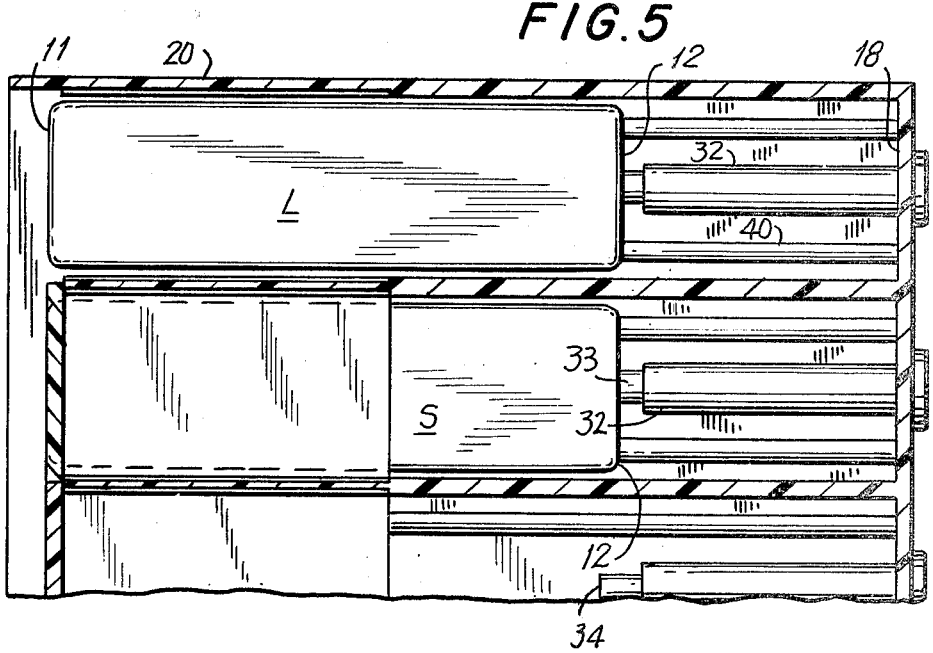
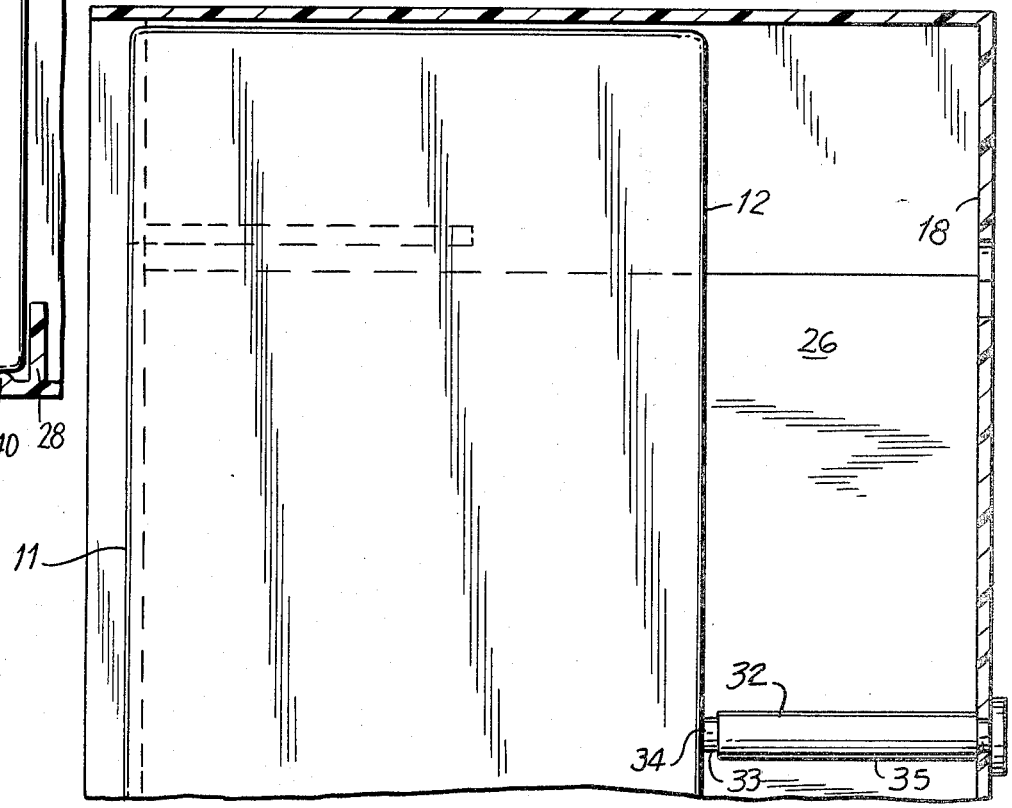

VIDEO CASSETTE STORAGE AND EJECTION DEVICE

The present invention relates generally to devices for storing cassettes and similar items and, in particular, to containers for storing and selectively presenting video tape cassettes.

In recent years, cartridges and cassettes for various types of audio and video tapes, which are adapted to be used in conjunction with appropriate recording and playback devices, have become extremely popular. Tape cartridges and cassettes for various types of sound recording are today extremely common and range in size from two-inch long dictating machine tape cartridges to much larger four and eight track stereo tape cassettes. More recently, video tape cassettes, adapted to be used with video tape recording and playing machines, have become increasingly common and popular.

Devices have long existed for storing and presenting cassettes and objects of comparable size and shape. Such devices allow the owner of several cassettes to neatly maintain them and to select one cassette at a time for use.

For purposes of compactness, such storage devices often tend to store the cassettes extremely close to one another, such that it is difficult to grip the front of a cassette manually. Various solutions to this problem are already known which incorporate ejection mechanisms which have tended to be cumbersome, complicated and expensive. Such mechanisms often have many moving parts, thereby making it possible and probable that malfunctions will occur.

An additional problem with cassette storage devices of the prior art has revolved around the fact that cassettes have been marketed having various sizes, both from one medium to another, and also within the very same medium. For example, manufacturers of the currently popular video tape recording and playback machines have generally produced and sold cassettes which are only compatible with their own recording and playing machines. Consequently, in the video tape cassette industry, cassettes with different dimensions have found their way into the marketplace.

As a result of this disparity of sizes, cassette storage devices which are designed to accommodate cassettes of a given size have been unable to accommodate shorter cassettes properly, and have been unable to accommodate taller cassettes at all. Manufacturers and sellers of such storage devices have had to make available different storage devices for cassettes of different dimensions. Similarly, purchasers of cassettes of different sizes, who might not need an entire storage device for each different size of cassette, have been forced to purchase more than one storage device to properly store all of their cassettes.

It is therefore an object of the present invention to provide an improved container for storing and selectively presenting video tape cassettes and similar items in a simple, inexpensive and trouble-free device.

It is a further object of the present invention to provide such a container which allows compact and tight storage of cassettes and from which a desired cassette may be readily extracted.

It is another object of the present invention to provide a container for storing and selectively presenting video tape cassettes which is adapted to store cassettes of two different heights.

In an illustrative embodiment demonstrating certain aspects of the present invention, a container for storing and for selectively presenting a plurality of stored, generally rectangular, polyhedral objects of substantially equal thickness and depth, each of the polyhedral objects having a front portion and a rear panel, includes a longitudinally extending box having longitudinally extending rear and bottom walls. Transversely extending end walls are affixed to and join the respective transverse ends of the rear and bottom walls. The rear, bottom and end walls form the box and define a storage area. A plurality of transversely extending lower guide walls are mounted to the bottom wall and project upwardly therefrom. The lower guide walls and the end walls form partitions which define a plurality of object storage locations. Each of the storage locations is of a longitudinal extent slightly in excess of the thickness of the polyhedral objects with the thickness and spacing of the partitions being constructed and arranged such that when the polyhedral objects are transversely placed into adjacent storage locations, the longitudinal space between the adjacent polyhedral objects is minimal and insufficient to accommodate a human finger. A plurality of transversely extending ejection members are each mounted to the rear wall in a manner to have at least a contact surface thereof at least selectively project into one of the storage locations. Each contact surface is movable from a first position to a second position and is adapted to contact the rear panel of one of the polyhedral objects when the polyhedral object is inserted into the storage location and when the rear panel is at the first position. The ejection members are constructed and arranged so that when one of the polyhedral objects is moved rearwardly into the storage area thereby moving a corresponding one of the contact surfaces from the first toward the second position, upon the polyhedral object being released, the ejection member urges the polyhedral object a sufficient transverse distance such that the polyhedral object rear panel extends outwardly from the first position, whereby at least a portion of the front portion of said polyhedral object may be grasped by human fingers.

As a further aspect of the present invention, the foregoing container preferably further comprises a spacing member removably mounted within at least one of the storage locations for use in adjusting the height of at least that storage location.

The above brief description as well as further objects, features and advantages of the present invention will be more fully understood by reference to the following detailed description of the presently preferred, but nonetheless illustrative, embodiment, in accordance with the present invention, when taken in conjunction with the accompanying drawing, wherein:

FIGS. 2, 3 and 4 are enlarged fragmentary sectional right side elevational views through a typical storage location sequentially illustrating the action of ejection members of the present invention;

FIG. 5 is an enlarged fragmentary sectional top plan view taken substantially along the line 5—5 of FIG. 1, and looking in the direction of the arrows;

FIG. 6 is an enlarged fragmentary front elevational view illustrating one storage location of the subject invention and illustrating a spacing member in place and a smaller size cassette being stored;

FIG. 7 is an enlarged fragmentary sectional right side elevational view taken substantially along the line 7—7 of FIG. 1, and looking in the direction of the arrows, illustrating the interior of a storage location containing a larger size cassette; and FIG. 8 is an exploded partial section view of an ejection member.

Figure 1:
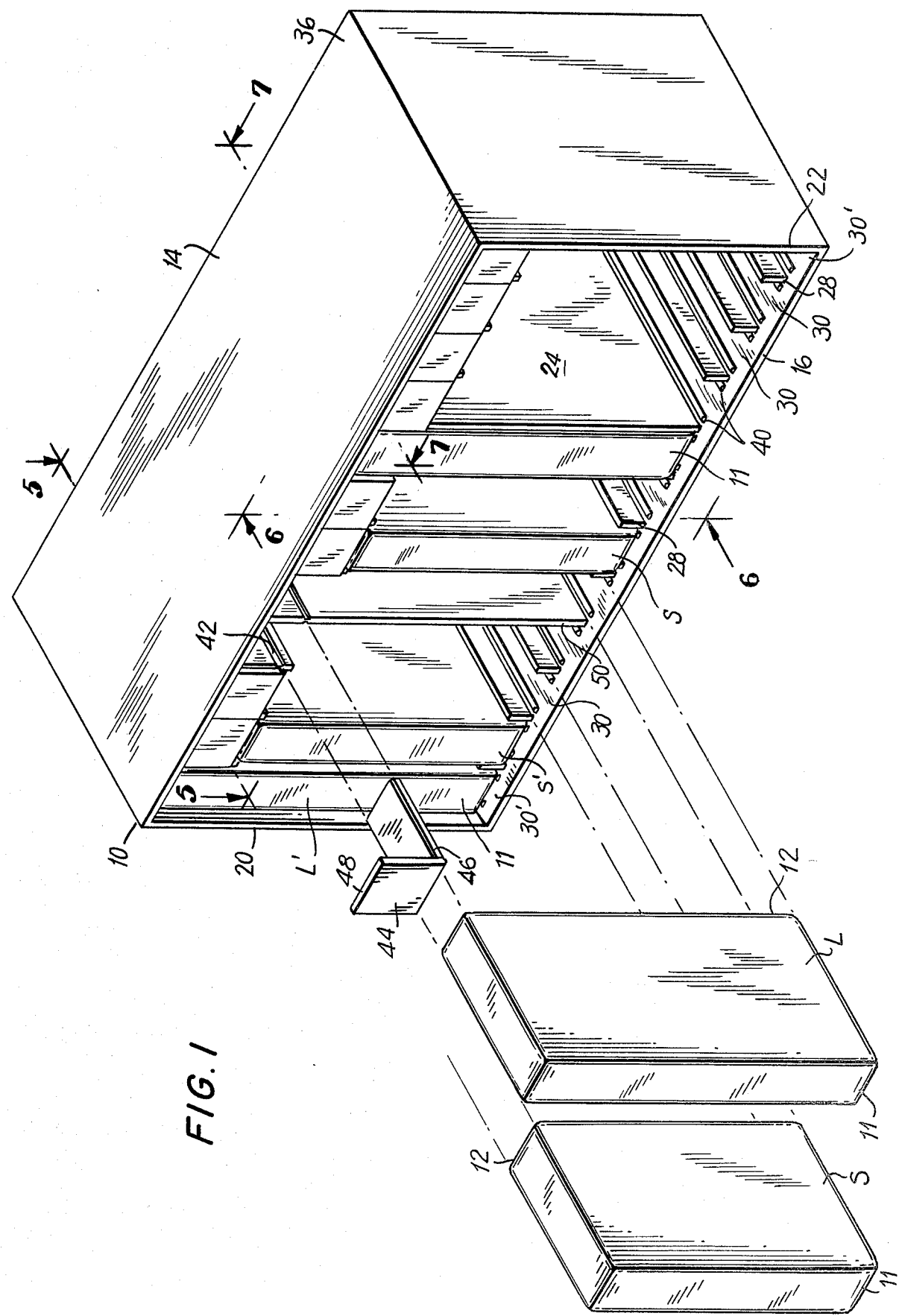
FIG. 1 is a perspective view of a representative form of the present invention illustrating a removably mounted spacing member and also illustrating how the present invention is capable of storing polyhedral objects of two different heights.

Referring now specifically to the drawing and first to FIG. 1, there is shown an illustrative container embodying features of the present invention, generally designated by the reference numeral 10. As will be described herein, the container 10 is adapted to store and selectively present a plurality of stored, generally rectangular polyhedral objects such as video tape cassettes. While the present description generally refers to such objects as cassettes for purposes of convenience, it will be understood that the present invention can be used with any generally rectangular polyhedral objects including, for example, photographic film cartridges.

In a manner hereinafter described more fully, the container 10 is adapted to store and selectively present large size cassettes L, and small size cassettes S. As seen in FIGS. 1 and 5, the large cassette L and the small cassette S are of substantially equal thickness and substantially equal depth, but are of different heights, with the large cassette L having a greater height than the small cassette S. Each cassette L or S has a front portion 11 and a rear panel 12, which is preferably substantially planar.

Referring again to FIG. 1, the container 10 includes a longitudinally extending box 14. The box 14 includes a longitudinally extending bottom wall 16 and a longitudinally extending rear wall 18, the latter being best seen in FIGS. 3 through 7. The box 14 also includes transversely extending end walls 20 and 22 which are affixed to and join the respective transverse ends of the rear wall 18 and the bottom wall 16.

The rear wall 18, the bottom wall 16 and the end walls 20 and 22 form the exterior of the box 14 which has a front face 24. The front face 24, as illustrated in the present preferred embodiment, is fully open. It will be appreciated that the front face 24 may have a removable cover or door which could be mounted to the box 14 with a conventional hinge or slide mechanism.

The rear wall 18, the bottom wall 16 and the end walls 20 and 22 define a storage area generally designated as 26 (see FIG. 7), which storage area 26 has a depth in excess of the depth of the cassettes L and S, as can be best seen in FIGS. 5 and 7.

Referring again to FIG. 1, a plurality of transversely extending lower guide walls 28 are mounted to the bottom wall 16 and project upwardly therefrom. The lower guide walls 28 and the end walls 20 and 22 form a plurality of parallel, vertically upstanding partitions, as can be best seen in FIG. 1. The aforesaid partitions (i.e. the lower guide walls 28 and the end walls 20 and 22) define a plurality of object storage locations 30. It will be appreciated that in all but the two extreme left and right storage locations 30', the partitions defining the storage locations comprise two of the lower guide walls 28. At the extreme storage locations 30', the partitions forming the storage locations 30' are one of the end walls 20 and 22 and one of the lower guide walls 28. As described more fully hereinafter, one or more of the lower guide walls 28 may be replaced by a unitary guide wall 50, which performs all the functions of the lower guide walls 28.

As can be best seen in FIG. 6, the storage locations 30 have a longitudinal extent, as defined by the space between the partitions, which is slightly in excess of the thickness of the video tape cassettes L and S.

As can be best seen in FIG. 1, the thickness and spacing of the lower guide walls 28, and of the end walls 20, 22, are such that when video tape cassettes (such as L' and S', shown in FIG. 1) are placed into adjacent storage locations, the space between any two adjacent video tape cassettes is minimal and insufficient to accommodate a human finger. Thus, for example, were it not for the cassette dispensing apparatus hereinafter described, it would be extremely difficult, if not impossible, to manually extract large video tape cassette L' as illustrated in FIG. 1 without the aid of a tweezer or other grasping aid.

As illustrated in FIGS. 5 and 7, a plurality of ejection members 32 are mounted to the rear wall 18 in a manner to have a contact surface 34 thereof project transversely into each one of the storage locations 30. In the presently preferred embodiment, the ejection member 32 is constructed much like the actuating mechanism of a conventional retractable ball point pen. Such a unit may be actuated by pressing on a protrusion to latch the extending mechanism, compress a compression spring, and extend or expose the point; and may be unlatched by again pressing on the protrusion and releasing it to permit the compression spring to expand, pushing on the extending member which thereby retracts the pen point to which it is fixed.

In the preferred embodiment, the ejection member 32 has a contact element 33 which is slidably mounted within a casing element 35. The casing element 35 of the ejection member 32 is mounted to the rear wall 18 by any conventional means such as by its rear end having female screw threads which are engaged with the male screw threads of a cap member 39 which projects through a hole in the rear wall 18. While in the presently preferred and illustrative embodiment virtually all of the casing element 35 of the ejection device 32 is on the inside of the box 14, it will be appreciated that the present invention can be designed and constructed with most or all of the casing element 35 outside of the box 14, with only the contact element 33 projecting inwardly into the box 14. The internal mechanisms of the ejection member 32 in the preferred embodiment are more fully described hereinafter.

The contact element 33 of the ejection member 32 is movable relative to the casing element 35 and directly or indirectly abuts a compression spring 37 contained within the casing element. Accordingly, the contact surface 34 of the contact element 33 is movable from an equilibrium position relative to the rear wall 18 (at which position the contact surface 34 rests when the compression spring 37 or other compression member in the ejection member 32 is in its extended or substantially uncompressed state), to a first position closer to the rear wall 18 (at which position the compression spring 37 or other compression member within the ejection member 32 is partially compressed and the contact element 33 is held in position or latched), and to a second position even closer to the rear wall 18 corresponding to a more fully compressed state of the compression spring 37 or other compression member within the ejection member 32. It has been found that a contact element 33 having a travel of about ⅛ inch between the equilibrium and first positions will perform satisfactorily.

The contact surface 34 of the contact element 33 projects inwardly into the appropriate storage location 30 and is adapted to contact the rear panel 12 of one of the video tape cassettes L or S when it is at the equilibrium, first or second positions within the storage locations 30. The latching and unlatching is accomplished through the use of conventional means such as that used in retractable ball point pens, as more fully discussed hereinafter.

The construction and operation of the ejection member 32 is best illustrated by a comparison of FIGS. 2, 3 and 4. To store a cassette L, the cassette L is inserted transversely into a storage location 30. The rear panel 12 of the cassette L will encounter the contact surface 34 of the contact element 33 of the ejection member 32 at the equilibrium position. The compression spring 37 within the ejection member 32 will (through the contact element 33) partially resist the continued movement of the cassette L from the equilibrium position to the first position, at which position the compression spring 37 within the ejection device 32 is partially compressed and the contact element 33 is latched. FIG. 2 shows the video tape cassette L in its stored condition in which the rear panel 12 of the video tape cassette L rests against the contact surface 34 of the ejection member 32 at the first position, at which the compression spring 37 within the ejection device 32 has been partially compressed and the contact member 33 is latched. Accordingly, at the position shown in FIG. 2, both the contact surface 34 of the ejection member 32, and the rear panel 12 of the large cassette L, are located at what has previously been referred to as the first position, corresponding to the distance from the rear wall 18 to the contact surface 34 when the compression spring 37 of the ejection member 32 is in its partially compressed state and the contact element 33 is latched.

It will be appreciated that when a group of adjacent cassettes L, S are fully inserted in the container 10 so that their rear panels 12 are each at the previously defined first position, the front portions 11 of the cassettes L, S will form a flush facade since the depth of the cassettes L, S are substantially equal. In this condition, in view of the longitudinal spacing of the cassettes, it would be difficult or impossible to manually extract a cassette without some grasping aid.

In order to present a video tape cassette L and allow it to be removed by hand from the container 10, the video tape cassette L is moved further rearwardly into the storage area 26, thereby causing the contact element 33 to move from a location corresponding to the first position of the contact surface 34 to a location corresponding to the second position of the contact surface 34, which corresponds to a more fully compressed state of the compression spring 37 within the ejection device 32 (see FIG. 3), whereupon the contact element 33 becomes unlatched in a well known manner.

When the video tape cassette L is then released, the compression member within the ejection member 32 expands so that the contact element 33 moves outwardly, whereby the contact surface 34 moves back through the first position of FIG. 2 to the equilibrium position of FIG. 4. This movement of the contact element 33 urges the video tape cassette in a transverse direction outwardly from the container 10. The compression spring 37 of the ejection member 32 is under sufficient compression when the contact surface 34 is moved from the first to the second position that upon release of the video tape cassette, the contact element 33 urges the video tape cassette a sufficient distance such that at least a portion of the front portion 11 of the cassette L may be grasped by human fingers, since it is now extending from the equilibrium position corresponding to the flush facade.

It will be appreciated that the ejection member 32 may be constructed in a far simpler way, with a simple spring or resilient member replacing the mechanism just described. The spring or resilient member may itself protrude from the casing element 35 and terminate at a contact surface 34, or it may more advantageously be joined to a piston-like contact element 33 having a contact surface 34 and being slidably mounted within the casing element 35 as in the preferred embodiment. In such a construction, there is no "equilibrium position" as previously described. Instead, the cassettes L, S are stored with the rear panel 12 of the cassettes L, S and the contact surface 34 at a first position corresponding to the uncompressed state of the compression member within the ejection member 32. To eject a cassette, a cassette is pushed inwardly, thereby driving the contact element 33 to a position corresponding to a second position of the contact surface 34 which also corresponds to a compressed state of the compression member within the ejection member 32. The cassette is then released, whereupon the compression member of the ejection member 32 expands and pushes the contact surface 34 back to (and perhaps slightly beyond) the first position, thereby driving the cassette outwardly.

When the container according to the present invention is constructed including only the elements hereinbefore described, it will be necessary for the lower guide walls 28 to project upwardly from the bottom wall 16 a sufficient distance from the bottom wall 16 to allow the video tape cassettes L and S to stand without the assistance of a video tape cassette in the adjacent storage location 30. In the presently preferred embodiment illustrated herein, however, additional components are included which make it unnecessary for lower guide walls 28 to project upwardly more than a relatively nominal distance.

The preferred embodiment of the present invention includes a longitudinally extending top wall 36, which is affixed to and joins the rear wall 18 and the end walls 20 and 22. A plurality of transversely extending upper guide walls 38 are mounted to the top wall 36 and project downwardly from the top wall 36, as best seen in FIGS. 1 and 6. The upper guide walls 38 are longitudinally positioned to correspond to the longitudinal positions of the lower guide walls 28.

As best illustrated in FIG. 6, the upper guide walls 38 extend downwardly into the storage area 26 a sufficient distance such that the topmost portion of a stored small cassette S stands higher (as seen in FIG. 6) than the lowest point of the upper guide walls 38. The smaller cassettes S can thus be supported in the container 10 without the necessity of the lower guide walls 28 projecting more than a nominal height. Since the upper guide walls 38 are long enough to support the small cassettes S, they can of course also support the large cassettes L.

As seen in FIG. 1, it is advantageous, in at least one location in the box 14, for the lower guide wall 28 and the upper guide wall 38 to merge into and be replaced by a single unitary guide wall 50, as seen in FIG. 1. The use of a unitary guide wall 50 provides the container 10 with additional structural integrity and helps to prevent the container 10 from collapsing if a force is exerted on the top wall 36 or the bottom wall 16. It will be appreciated that this construction can be employed throughout the container 10; however, such construction will add to the material costs of the device and to the weight of the container 10.

As best seen in FIGS. 1 and 6, at least one and preferably a pair of transversely extending rails 40 are mounted to the bottom wall 16 substantially parallel to the lower guide walls 28 and the end walls 20 and 22 within at least one and preferably within all of the storage locations 30. As best seen in FIG. 6, the rails 40 within each storage location 30 are longitudinally spaced from each other a distance less than the thickness of the video tape cassettes L and S, such that it is possible for the entire video tape cassette S to rest on the rails 40. The spacing of the rails 40 should also be such that even if the video tape cassette L or S is moved longitudinally to an extreme position within the storage location 30, the video tape cassette L and S will still be resting on at least one and preferably both of the rails 40. The rails 40 allow the cassettes L, S to travel more smoothly by reducing the contact area with the box 14, thus reducing friction.

In computing the distance by which the upper guide walls 38 should project downwardly into the storage area 26, the presence or absence of the rails 40 must be considered. If no rails are used, the upper guide walls 38 should project further down than if rails 40 are present, since without rails 40 the cassettes L, S will sit lower in the storage location 30.

The container 10 of the present invention is made adaptable to store video tape cassettes having either a first or a second height (as illustrated herein by large cassette L and small cassette S) by means of a spacing member or slug which is removably mounted within at least one and preferably all of the storage locations 30 for use in adjusting the height of the storage locations 30. The presently preferred embodiment includes a spacing member adapted to be removably mounted adjacent to the top wall 36 of the container 10, but it will be appreciated that it is possible to construct a container according to the present invention with a spacing member adjacent to the bottom wall 16 of the container 10.

As best illustrated in FIGS. 1 and 6, a transversely extending slot 42 is formed in at least one and preferably both of the upper guide walls 38 adjacent to the storage location 30 proximate the front face 24 of the box 14.

A removable L-shaped spacing member or slug 44 is constructed having a nominal longitudinal dimension substantially equal to the longitudinal extent of the storage location 30 (as best seen in FIG. 6) and a nominal height substantially equal to the difference between the height of large cassette L and the height of small cassette S, as best seen in FIG. 1.

The slug 44 has a track 46 extending transversely along at least one side of the slug 44 and preferably has a track 46 on each side of the slug 44. The tracks 46 are constructed and arranged to be received in the slots 42 in the upper guide walls 38, as seen in FIGS. 5 and 6. When the slug 44 is mounted within a storage location 30 by placing the tracks 46 in the slots 42, the portion of the storage location 30 adjacent to the top wall 36 is sealed off by upper flange 48 of the slug 44. The outer, depending surface of the upper flange 48 can be advantageously used to accommodate a label.

It can be appreciated from FIG. 6 that the slots 42 need only extend rearward a distance sufficient to allow the slug to be placed flush with the front face 24 of the container 10. Indeed, it is desirable to provide a means for preventing the slug 44 from being pushed too far into the container 10, which can reside either in the construction of the flange 48 which can be built to be stopped by the upper guide walls 38, by the top wall 36, or can reside in limiting the depth of the slots 42.

The use and operation of the container 10 of the present invention begins with the user deciding where in the container 10 he wishes to store large tape cassettes L or small tape cassettes S. In any storage location 30 for which the user wishes to store a small tape cassette S, a slug 44 is inserted by guiding the tracks 46 into the slots 42 of the upper guide walls 38. In a storage location in which the user wishes to store a large tape cassette L, no slug 44 is added and any slug 44 already located in the storage location 30 is removed.

The user then places the cassettes L and S into the desired storage location 30 by guiding the cassette bebetween the lower guide walls 28 and the corresponding upper guide walls 38 along the rails 40 until the user tactually detects that the rear panel 12 of the cassette has reached the contact surface 34 of the respective compression plunger 32.

To remove the cassette, the cassette is pushed inwardly toward the rear wall 18, thereby moving the contact surface 34 of the ejection member 32, from the first position to the second position. The user then releases the cassette and the ejection member expands to the first position, thereby impelling the cassette L or S a distance such that at least a portion of the front portion 11 of the cassette L or S extends beyond the front facade of cassettes so that it then can be grasped by human fingers and removed.

The internal mechanism of the ejection member 32 in the preferred and illustrative embodiment of the present invention is illustrated in detail in FIG. 8. As viewed from left to right in FIG. 8, in exploded form, the ejection member 32 includes the casing element 35, the contact element 33, the retaining element 52, the compression spring 37, and the cap member 39.

The casing member 35, at its rightmost portion, has an enlarged bore 80 with female threaded portions 82, which are adapted to mate with male threaded portion 84 of the cap member 39. The threaded portion 84 of the cap member 39 also has a bore which receives the right-hand end of the compression spring 37. The contact element 33 has, at its right end as seen in FIG. 8, an enlarged portion 54, which enlarged portion 54 has an internal bore 55 and a series of axially projecting teeth 58 at its rightmost end.

The casing element 35 has an internal bore 66 at its leftmost end adapted to slidably receive the leftmost long elongated portion of the contact element 33. The casing member 35 also has an internal bore 68 which is adapted to receive the enlarged portion 54 of the contact element 33.

The retaining element 52, at its leftmost end, has an outer diameter adapted to be received in the internal bore 55 of the enlarged portion 54 of the contact element 33. The retaining element 52 itself has an enlarged portion 57 at its rightmost end. Eight equally spaced radially projecting raised bosses 56 are mounted to the enlarged portion 54 of the contact element 33. The enlarged portion 57 of the retaining element 52 has a plurality of teeth 60 which project axially toward the left as seen in FIG. 8 and which are adapted to be engaged with the teeth 58 at the right end of the enlarged portion 54 of the contact element 33, as more fully described below. The enlarged portion 57 of the retaining element 52 also has a bore (not shown) which receives the left-hand end of the compression spring 37.

Four raised projections 62 are mounted to the enlarged portion 57 of the retaining element 52 and project radially outward. Each of the raised projections 62 has a camming surface 64 at its leftmost end, as seen in FIG. 8.

The casing element 35 has four deep elongated grooves 70 and four shallow elongated grooves 72 which are alternately arranged within the internal bore 68 and which are separated by lands 74 between the deep elongated grooves 70 and the shallow elongated grooves 72. At the end of each land 74 is a camming surface 76, and across the entrance to each of the shallow elongated grooves 72 is an abutment 78.

When the parts of the ejection member 32 are assembled, it will be readily appreciated that the cap member 39 is threaded by its threaded portion 84 into the threaded portion 82 of the bore 80 of the casing element 35. The contact element 33 will rest within the casing element 35 such that the long elongated portion of the contact element 33 sits within and extends from the internal bore 66 while the enlarged portion 54 sits within the internal bore 68 of the casing element 35. The raised bosses 56 on the enlarged portion 54 are slidably engaged within both the shallow elongated grooves 72 and the deep elongated grooves 70. The retaining element 52 is engaged with the contact element 33 whereby the leftmost portion of the retaining element 52 is slidably received in the internal bore 55 of the enlarged portin 54 of the contact element 33. The compression spring 37 is received within the threaded portion 84 of the cap member 39 and within the retaining element 52.

When the contact element 33 is in its uncompressed condition (corresponding to FIG. 4), each of the raised projectins 62 is slidably engaged with one of the deep elongated grooves 70. The raised bosses 56 on the enlarged portion 54 of the contact element 33 are slidably engaged with the deep elongated grooves 70 and the shallow elongated grooves 72. However, due to the relative alignment of the raised bosses 56 and the teeth 58, as compared with the relative alignment of the teeth 60 and the raised projections 62, the teeth 58 at the end of the enlarged portion 54 are slightly offset with respect to a fully meshed position with the teeth 60 on the enlarged portion 57 of the retaining element 52.

When the contact element is depressed inwardly, thereby pushing the retaining element 52 up against the force of the compression spring 37, the raised bosses 56 continue to remain engaged with the deep elongated grooves 70 and the shallow elongated grooves 72 such that the contact element 33 only slides with respect to the casing member 35 and is not free to rotate. When the retaining element 52 has been sufficiently displaced by the contact element 33 such that the raised projections 62 are no longer embedded within and restrained by the deep elongated grooves 70, the retaining element 52 attains a freedom to rotate about its axis. When this occurs, the offset relationship of the teeth 58 with respect to the teeth 60 created a camming effect which causes the retaining element 52 to rotate by a very slight degree (i.e., less than one-eighth of a revolution).

When pressure on the contact element 33 is released, the compression spring 37 is thus allowed to drive the mechanism back toward the left as seen in FIG. 8, the aforementioned slight rotation of the retaining element 52 is sufficient to allow the camming surface 64 of the raised projection 62 to interact with the camming surfaces 76 of the lands 74. This causes the retaining element 52 to rotate additionally such that each of the raised projections 62 is now aligned with a shallow elongated groove 74 as opposed to a deep elongated groove 70 where it had initially rested. However, the abutment 78 at the entrance to each of the shallow elongated grooves 72 prevents the entry of the raised projection 62 into the shallow elongated grooves 72 and thus prevents further movement of the retaining element toward the left in FIG. 8 and creates the latching effect.

When the contact element 33 is again depressed toward the right, once again there is incomplete engagement between the teeth 58 of the contact elements 33 and the teeth 60 of the retaining element 52. When the retaining element 52 has moved to the right a sufficient distance to allow the retaining element 52 to rotate, the camming action of the teeth 58 and 60 again causes the retaining element to rotate a slight degree. Once again, this slight rotation allows the camming surfaces 64 on the raised projections 62 to interact with the camming surfaces 76 at the ends of the lands 74, which thus causes the retaining element 52 to rotate further and allows the raised projections 62 to again enter the deep elongated grooves 70 and spring back to the left as in the initial uncompressed position.

As will be readily apparent to those skilled in the art, the invention described may be used in other specific forms without departing from its spirit or essential characteristics. The present embodiment is, therefore, considered as illustrative and not restrictive, the scope of the invention being indicated by the claims rather than by the foregoing description, and all changes which come within the meaning and range of equivalence of the claims are therefore intended to be embraced therein.

What is claimed is:

1. A container for storing and for selectively presenting a plurality of stored generally rectangular polyhedral objects of substantially equal thickness and depth, each of said polyhedral objects have a front portion and a substantially planar rear panel, said container comprising: a longitudinally extending box having at least longitudinally extending rear and bottom walls; transversely extending end walls affixed to and joining the respective transverse ends of said rear and bottom walls; said rear, bottom and end walls forming said box and defining a storage area; a plurality of transversely extending lower guide walls mounted to said bottom wall and projecting upwardly therefrom, said lower guide walls and said end walls forming partitions defining a plurality of object storage locations, each of said storage locations being of a longitudinal extent slightly in excess of said thickness of said polyhedral objects, the thickness and spacing of said partitions being constructed and arranged such that when said polyhedral objects are transversely placed into adjacent storage locations, the longitudinal space between said adjacent polyhedral objects is minimal and insufficient to accommodate a human finger; and a plurality of transversely extending ejection members, each mounted to said rear wall in a manner to have at least a contact surface thereof at least selectively project into one of said storage locations; each of said contact surfaces being movable from a first position to a second position and being adapted to directly contact said rear panel of one of said polyhedral objects when said polyhedral object is inserted into said storage location and when said rear panel is at said first position; said ejection member being constructed and arranged that when one of said polyhedral objects is moved rearwardly into said storage areas by being directly pushed inwardly at said front portion, thereby moving a corresponding one of said contact surfaces from said first toward said second position, upon said polyhedral object being released, said ejection member directly abuts said polyhedral object and urges said polyhedral object a sufficient transverse distance such that said polyhedral object rear panel is moved outwardly from said first position, whereby at least a portion of said front portion of said polyhedral object may be grasped by human fingers.

2. A container according to claim 1 further comprising at least one transversely extending rail mounted to said bottom wall substantially parallel to said partitions within at least one of said storage locations.

3. A container according to claim 1 further comprising a longitudinally extending top wall affixed to and joining said rear wall and said end walls, said rear, bottom, end and top walls defining a front opening.

4. A container according to claim 3 wherein said partitions further comprise a plurality of transversely extending upper guide walls mounted to said top wall and projecting downwardly from said top wall, said upper guide walls longitudinally positioned to correspond to the longitudinal positions of said lower guide walls.

5. A container according to claim 3 or claim 4 further comprising a slug removably mounted within at least one of said storage locations for use in adjusting the height of at least one of said storage locations.

6. A container according to claim 4 adapted to store a plurality of rectangular polyhedral objects each having either a first or a second height, said container comprising, in at least one of said storage locations, a removable slug constructed and arranged to adjust the height of said at least one storage location, and receiving means in said partitions constructed and arranged to receive said removable slug.

7. A container according to claim 4 adapted to store a plurality of rectangular polyhedral objects each having either a first or a second height, said container comprising, in at least one of said storage locations, transversely extending slots formed in both of said upper guide walls and end wall adjacent to said at least one storage location proximate said front opening, and a removable slug having a nominal longitudinal dimension substantially equal to said longitudinal extent of said storage locations and a nominal height substantially equal to the difference between said first and second polyhedral object heights and including a pair of parallel tracks extending transversely along either side of said slug, said tracks constructed and arranged to be received in said slots, said slug constructed and arranged to selectively seal off the portion of said storage location between said slots and said top wall.

8. A container according to claim 7 wherein said slug is L-shaped.

9. A container according to claims 3, 4, 6, 7 or 8 further comprising a pair of transversely extending rails mounted to said bottom wall proximate said lower guide walls within at least one of said storage locations, said pair of rails being longitudinally spaced from each other a distance less than said thickness of said polyhedral objects.

10. A container according to claim 1 wherein at least one of said contact surfaces is formed on a contact element of said ejection member and wherein said ejection member is constructed and arranged so that said contact element is additionally movable from a location corresponding to an equilibrium position of said contact surface, said compression member within said ejection member being substantially uncompressed at said equilibrium position; said contact element being movable to a location corresponding to said first position of said contact surface whereupon said compression member is partially compressed and said contact element is latched; said ejection member being further constructed and arranged so that said contact element is unlatched upon said compression member being further compressed when said contact element is subsequently moved from said location corresponding to said contact surface first position to a location corresponding to said contact surface second position and thereafter said compression member urges said contact element toward said location corresponding to said contact surface equilibrium position.

* * * * *